(12) United States Patent
Fricke et al.

(10) Patent No.: US 12,128,643 B2
(45) Date of Patent: Oct. 29, 2024

(54) METHOD FOR VULCANISING A TYRE BLANK

(71) Applicant: Continental Reifen Deutschland GmbH, Hannover (DE)

(72) Inventors: Bernd Fricke, Sehnde (DE); Heiko Hesse, Bueckeburg (DE); Lars Kielhorn, Wedemark (DE); Milos Kovac, Puchov (SK)

(73) Assignee: Continental Reifen Deutschland GmbH, Hannover (DE)

( * ) Notice: Subject to any disclaimer, the term of this patent is extended or adjusted under 35 U.S.C. 154(b) by 239 days.

(21) Appl. No.: 17/758,709

(22) PCT Filed: Nov. 30, 2020

(86) PCT No.: PCT/EP2020/083842
§ 371 (c)(1),
(2) Date: Jul. 13, 2022

(87) PCT Pub. No.: WO2021/144058
PCT Pub. Date: Jul. 22, 2021

(65) Prior Publication Data
US 2023/0078635 A1    Mar. 16, 2023

(30) Foreign Application Priority Data

Jan. 13, 2020  (DE) .................... 10 2020 200 293.2

(51) Int. Cl.
*B29D 30/06* (2006.01)
(52) U.S. Cl.
CPC .... *B29D 30/0662* (2013.01); *B29D 2030/067* (2013.01); *B29D 2030/0675* (2013.01)
(58) Field of Classification Search
CPC ........ B29D 30/0601; B29D 2030/0675; B29D 2030/067; B29D 30/0662
See application file for complete search history.

(56) References Cited

U.S. PATENT DOCUMENTS

| 5,055,245 A | 10/1991 | Hisatomi et al. |
| 5,129,802 A * | 7/1992 | Sergel ................ B29D 30/0606 425/38 |

(Continued)

FOREIGN PATENT DOCUMENTS

EP    0733456 A2    9/1996

OTHER PUBLICATIONS

International Search Report dated Mar. 9, 2021 of International Application PCT/EP2020/083842 on which this application is based.

*Primary Examiner* — Nahida Sultana
(74) *Attorney, Agent, or Firm* — Richard A. Wolf; Gregory Adams

(57) ABSTRACT

A method having the following steps is proposed:
a) placing a green tire (20) to be vulcanized in a vulcanization mold,
b) evaluating the temperature progression from the temperature sensor disposed in the cavity of the inner heater, wherein the energy input is adjusted both via the duration of the idle time and via the starting temperature,
c) calculating an adjustment in the duration for the steam phase (24) of the inner heater when the idle time varies from a defined threshold,
d) introducing steam into the inner heater of the vulcanization press and performing the steam phase (24, 25) for the calculated duration,
wherein the adjustment of the duration for the steam phase (24, 25) is intended to ensure an optimal input of thermal energy for the vulcanization of the green tire (20),
e) measuring the actual temperature progression with the temperature sensor (16) in the inner heater,
f) comparing the actual temperature progression (27) with a target temperature progression (26) for a particular vehicle tire type, (Continued)

Figure 1:
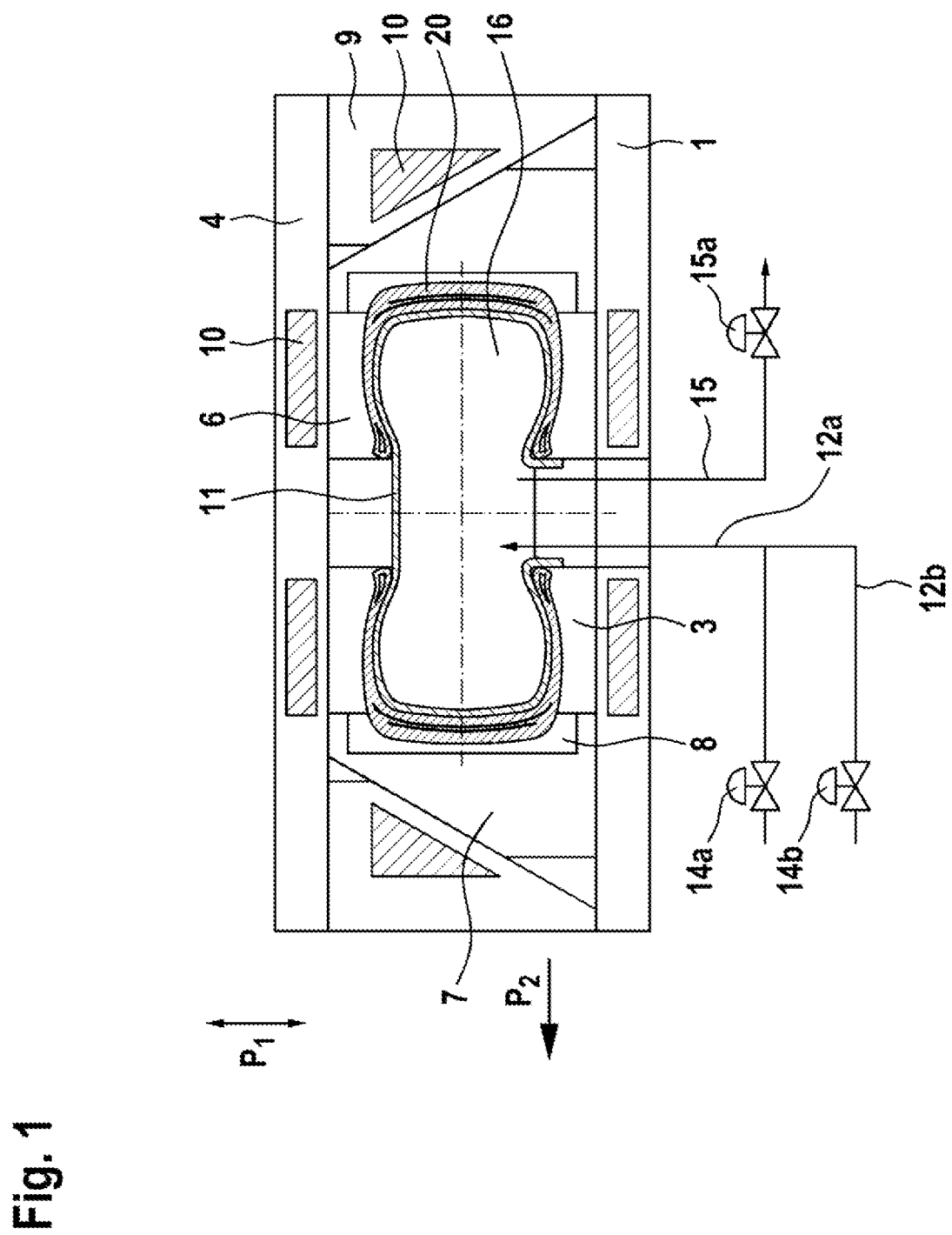

g) adjusting the duration for the flexible heating phase (28) of the inner heater, wherein the adjustment of the duration for the heating phase (28, 29) is intended to ensure an optimal input of thermal energy for the vulcanization of the green tire (20), h) completing the tire vulcanization.

6 Claims, 2 Drawing Sheets

(56) References Cited

U.S. PATENT DOCUMENTS

| | | | | |
|---|---|---|---|---|
| 5,145,688 | A * | 9/1992 | Ohtake | B29C 43/36 |
| | | | | 425/40 |
| 6,478,991 | B1 | 11/2002 | Mancosu et al. | |
| 6,620,367 | B1 * | 9/2003 | Mitamura | B29C 35/04 |
| | | | | 264/315 |
| 2011/0262572 | A1 * | 10/2011 | Fricke | G01J 5/00 |
| | | | | 425/29 |
| 2012/0223463 | A1 * | 9/2012 | Kovac | B29D 30/0601 |
| | | | | 264/501 |

\* cited by examiner

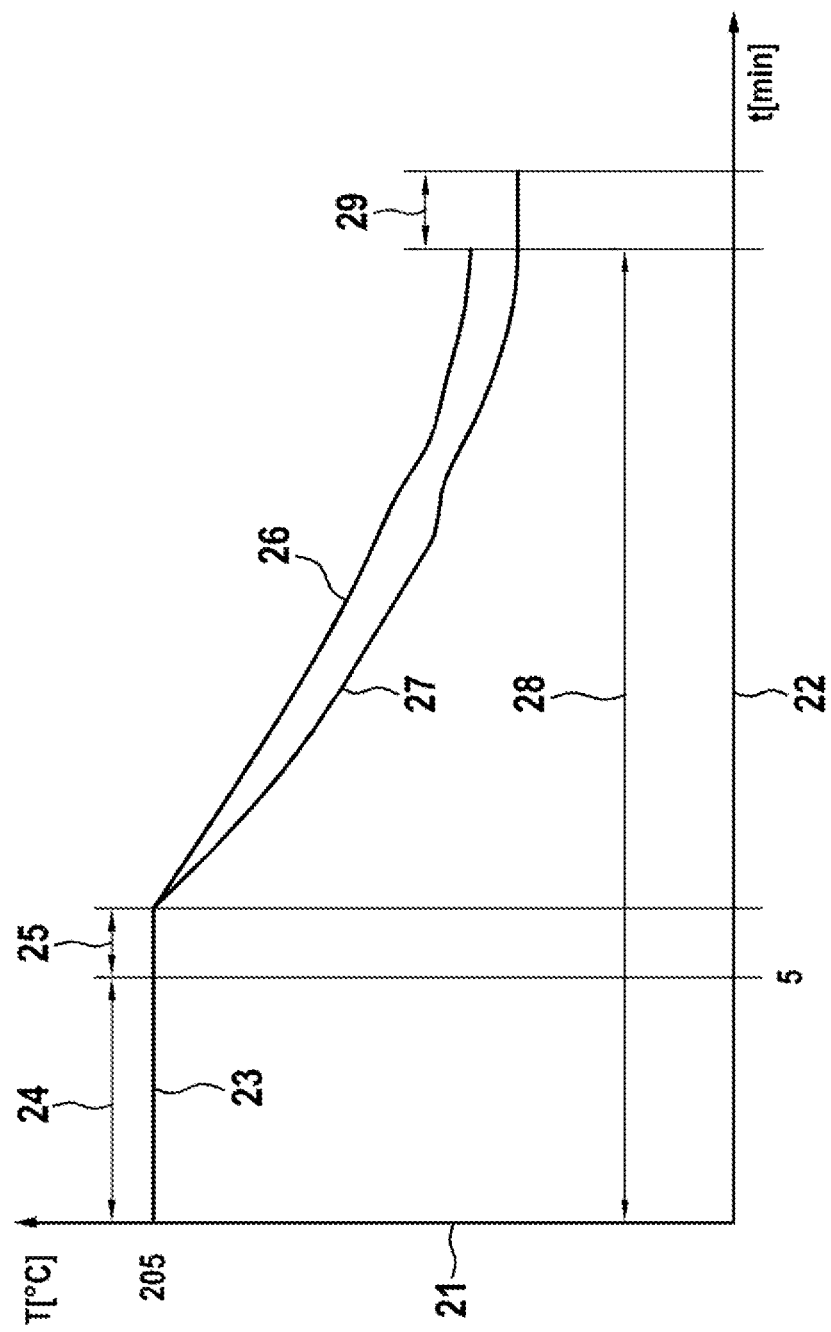

METHOD FOR VULCANISING A TYRE BLANK

The invention relates to a method of vulcanizing a green tire.

A pneumatic vehicle tire is vulcanized in a known manner in a heating press with a vulcanization mold in which the green tire is vulcanized under the action of heat and pressure in correspondingly configured mold constituents—sidewall shells, segment ring. What is envisaged here is both supply of heat from the outside via cavities in hotplates, called outer heating, and heat supply from the inside, called inner heating. For this purpose, flexible heating bellows introduced into the interior of the tire are filled with a heating medium, and hence vulcanization energy is supplied on the inside of the green tire. For the inner heating, typically steam and an inert gas, for example nitrogen, are used, with contacting the heating bellows with saturated steam for a certain period at the start of a steam heating operation. This gives the system the required heat of vulcanization. Subsequently, the internal pressure in the heating bellows is ensured by means of inert gas, with no supply of further energy to the system in the form of heat. Subsequently, natural condensation of the steam takes place within the heating bellows, and an uncontrolled temperature progression is established. There is no way of supplying thermal energy during the inert gas phase. Especially when there are leaks in the system, an undesirably high loss of energy can occur.

A further problem is that components of the inner heater can cool down in the course of a prolonged idle time of the vulcanization press.

This circumstance can have the effect that, in a first heating cycle after a prolonged idle time, the more significantly cooled components require more energy than otherwise in order to return to target temperature. This energy is then no longer available for the vulcanization of the green tire.

Too low an energy input for the vulcanization process can have the result, for example, of deterioration in specific tire properties.

It is an object of the invention to improve the inner heating method in this regard.

The object is achieved by means of a method according to claim 1, having the following steps:
a) placing a green tire to be vulcanized in a vulcanization mold,
b) evaluating the temperature progression from the temperature sensor disposed in the cavity of the inner heater before and during the vulcanization,
wherein the temperature progression can be used to ascertain an idle time of the vulcanization press,
c) calculating an adjustment in the duration for the steam phase of the inner heater when the idle time varies from a defined threshold,
d) introducing steam into the inner heater of the vulcanization press and performing the steam phase for the calculated duration,
wherein the adjustment of the duration for the steam phase is intended to ensure an optimal input of thermal energy for the vulcanization of the green tire,
e) measuring the actual temperature progression with the temperature sensor in the inner heater,
f) comparing the actual temperature progression with a target temperature progression for a particular vehicle tire type,
g) adjusting the duration for the flexible heating phase of the inner heater,
wherein the adjustment of the duration for the heating phase is intended to ensure an optimal input of thermal energy for the vulcanization of the green tire,
h) completing the tire vulcanization.

One particular advantage of the invention is considered to be that the novel method significantly improves the input of thermal energy via the inner heater. Before commencement of the vulcanization process, the temperature sensor of the inner heater measures the respective actual temperature.

This temperature can be used to ascertain whether the vulcanization press has just experienced a prolonged idle time. For example, the vulcanization press could have been put back into operation after a weekend.

In this case, the vulcanization press would be preheated, but would nevertheless start at a cooler internal bellows temperature. If a normal heating time were to be set under these conditions of the first heating cycle, as normally envisaged for the type of vehicle tire, the input of thermal energy for the vehicle tire would be too low.

One reason for this is that, for example, the middle mechanism of the heating bellows and the heating bellows themselves first have to be brought back to a normal production temperature. By the novel method, the respective idle time of the vulcanization press and/or the starting temperature is taken into account, and then the duration for the steam phase is correspondingly adjusted. The duration for the steam phase is extended to such an extent that the vehicle tire is vulcanized with an optimal input of thermal energy.

In an advantageous development of the invention, the threshold value for a variance is about 30 minutes.

Normally, the vulcanization press, after the ready-vulcanized vehicle tire has been removed, is occupied again by a new green tire. The idle time in a normal production process is normally below 30 minutes.

In a further advantageous development of the invention, the steam phase is extended by about 10% in the case of an idle time of greater than 30 minutes and less than 60 minutes.

This extension of the duration for the steam phase achieves an optimal input of thermal energy via the inner heater.

In a further advantageous development of the invention, the steam phase is extended by about 20% in the case of an idle time of greater than 60 minutes and less than 90 minutes.

In a further advantageous development of the invention, the steam phase is extended by about 30% in the case of an idle time of greater than 90 minutes and less than 120 minutes.

In a further advantageous development of the invention, the steam phase is extended by about 40% in the case of an idle time of greater than 120 minutes, in which case the steam phases are likewise prolonged in the subsequent heating cycles for the subsequent green tires.

In the case of such a long idle time of the vulcanization press, all components of the inner heater have cooled down considerably. In this case, it is likewise advantageous to adjust the steam phases of the subsequent heating cycles.

In a further advantageous development of the invention, the duration of the steam phase is extended by about 10% in the first subsequent heating cycle,
wherein the duration of the steam phase is extended by about 5% in the second subsequent heating cycle.

In a further advantageous development of the invention, the steam phase, in the case of an idle time of less than 30 minutes, is adjusted to the variance between the actual temperature progression and target temperature progression of the preceding heating cycle.

During the heating cycle, the temperature of the inner heater is measured continuously. If the actual temperature progression varies significantly from the target temperature progression, there is subsequently an adjustment of the duration for the steam phase for the subsequent heating cycle.

This significantly optimizes the input of thermal energy for the vulcanization of the green tires.

In a further advantageous development of the invention, during the heating phase, the temperature variances between the actual temperature and the target temperature are added up and averaged,
wherein a mathematical algorithm is subsequently used to calculate the heating time adjustment.

This method can be used to ascertain, in a simple manner, the temperature variances, and calculate the input of thermal energy still needed to achieve optimal vulcanization for the vehicle tire.

Further features, advantages and details of the invention will now be described in detail with reference to the figures, which illustrate a working example in schematic form. The figures show:

FIG. 1 a section diagram through a tire vulcanization mold in the closed state with the tire blank or green tire inserted and FIG. 2 a diagram showing temperature progressions within the heating bellows during the vulcanization of the tire blank.

FIG. 1 shows the essential constituents of a customary vulcanization mold for a pneumatic vehicle tire 20. The vulcanization mold is within a vulcanization press or heating press. In terms of basic construction, the heating press comprises an upper part of the press and a lower part of the press, provided with the required mechanisms for positioning of the tire to be vulcanized, for actuation (opening and closing) of the vulcanization mold, for introduction of the heating medium, and for removal of the ready-vulcanized tire.

The vulcanization mold shown in FIG. 1 is a multipart container mold having a lower hotplate 1, a lower sidewall shell 3, an upper hotplate 4, and an upper sidewall shell 6. Those constituents of the vulcanization press that are typically moved for opening and closing in vertical direction (arrow $P_1$) are the hotplate 4 with the upper sidewall shell 6 disposed thereon. The vulcanization mold also has a segment ring 7 that forms a multitude of shape segments which, when the vulcanization mold is opened, are moved apart radially, in the direction of arrow $P_2$ in FIG. 1, and hence release the ready-vulcanized tire 20. The segment ring 7 is provided with profile inserts 8 on the inside, which shape the profiled tread of the tire 20. Secured to the sidewall shells 3 and 6 are bead rings (not shown), which shape the bead regions of the tire 20. On the upper hotplate 4 is disposed a closure ring 9, the beveled inner face of which interacts with oppositely beveled outer faces of the segments of the segment ring 7 in such a way that, on closure of the vulcanization mold, the segments are moved together in radial direction to form the closed segment ring 7. The lower hotplate 1, the upper hotplate 4 and the closure ring 9 contain heating chambers 10 into which a heating medium is introduced for vulcanization of the tire.

FIG. 1 also shows a customary heating bellows 11 which is disposed in a known manner and is filled with saturated steam in order to center the tire blank within the mold from the inside, bringing the heating bellows 11 into a toroidal shape conforming to the tire. After the heating press has been closed completely, the green tire is heated from the outside, via the heating medium introduced into the heating chambers 10, typically hot steam, and from the inside by the inner heater, via the heating bellows 11.

The heating medium used for the inner heating via the heating bellows 11 is a combination of steam and inert gas, for example nitrogen. In the case of steam/inert gas heating, the heating bellows 11 is first charged with steam for a certain time. This is the steam phase. This gives the heating bellows 11 and the green tire 20 the required process heat. Subsequently, the pressure within the heating bellows 11 is raised by supplying inert gas. Thereafter, with commencement of the inert gas supply, no further energy is supplied in the form of heat. Natural condensation of the steam takes place within the heating bellows, and a free, uncontrolled temperature progression is established.

As shown by FIG. 1, there is a temperature sensor 16 within the heating bellows 11 that measures the temperature within the heating bellows throughout the vulcanization process and constantly passes on corresponding signals as actual values to an electronic device (not shown). The sensor 16 is disposed, for example, in the middle mechanism (not shown) of the heating bellows 11. FIG. 1 also shows, in schematic form, the feed 12a for steam and the feed 12b for inert gas, with valves 14a, 14b via which the flow volumes for steam and inert gas are controlled. A reduction in pressure within the heating bellows is possible via a controlled valve 15a in a return line 15.

FIG. 2 shows, in a diagram, a temperature progression which is measured in the heating bellows 11 during the vulcanization. Plotted on the X axis 22 is the vulcanization time in minutes; shown on the Y axis 21 is the actual temperature in ° C.

The heating cycle for the vulcanization of the vehicle tire first commences with a steam phase. During the steam phase, hot steam is introduced into the heating bellows, and a constant temperature is established, as shown by the straight line 23. The constant temperature may, for example, be 205° Celsius.

In the normal production process, when the heating press is at production temperature, the duration for the steam phase is, for example, five minutes. Subsequently, the valve would be closed for the supply of the steam.

In this heating cycle, however, it was found by the temperature sensor in the inner heater that the vulcanization press has not been heated up for a prolonged period of time.

The temperature sensor ascertained that the idle time was between 30 and 60 minutes. On account of the cooling of the inner heater, the duration for the steam phase is correspondingly extended.

In this case, the duration is extended by 10% compared to the normal duration for the steam phase.

The extension for the period in the diagram is indicated by the duration 25, which corresponds to a time of about 30 seconds.

After the steam phase has been extended, the valve for the supply of the saturated steam is closed again. Subsequently, the temperature of the inner heater drops continuously.

The temperature progression 27 shows the actual temperature sensor of the inner heater. This actual temperature progression is compared continuously to a target temperature progression 26.

The target temperature progression 26 shows the temperature progression at which there is an optimal input of thermal energy for the green tire to be vulcanized. The diagram shows that the actual temperature progression varies from the target temperature progression. The actual temperature progression shows a varying temperature drop of the inner heater.

The duration 28 of the heating phase indicates the time normally envisaged for the green tire to be vulcanized. It may, for example, be between 40 and 60 minutes. If the heating cycle were to be stopped after this normal heating time, the input of thermal energy for the vehicle tire would be too low.

The duration for the heating phase is extended by the duration 29 in order to achieve an optimal heat input for the vehicle tire.

According to the degree of variance of the actual temperature progression measured from the target temperature progression, a mathematical algorithm is used to calculate the extension of the heating time phase.

The variance between the actual temperature progression and the target temperature progression likewise has the effect that the duration for the steam phase can be adjusted in the next heating cycle.

The method can ensure that the vulcanized green tires always have a uniform high quality.

LIST OF REFERENCE SIGNS

1 . . . lower hotplate
3 . . . lower sidewall shell
4 . . . upper hotplate
6 . . . upper sidewall shell
7 . . . segment ring
8 . . . profile inserts
9 . . . closure ring
10 . . . heating chamber
11 . . . heating bellows
12*a* . . . feeds
12*b* . . . feeds
14*a* . . . valve
14*b* . . . valve
15 . . . return line
15*a* . . . valve
16 . . . temperature sensor in the inner heater
20 . . . green tire
21 . . . temperature T in ° C.
22 . . . duration in minutes
23 . . . temperature during the steam phase
24 . . . steam phase in a normal heating cycle, e.g. 5 minutes
25 . . . steam phase extended by 10%, e.g. 30 seconds
26 . . . target temperature progression
27 . . . actual temperature progression
28 . . . heating phase in a normal heating cycle, e.g. 40 minutes
29 . . . extended heating phase

The invention claimed is:

1. A method of vulcanizing a green tire, the method comprising:
    providing a vulcanization mold within a vulcanization press, the vulcanization mold having a heating bellows;
    determining an idle time of the vulcanization press;
    placing the green tire in the vulcanization mold during the idle time;
    performing an overall heat phase in which the green tire is heated for a duration of time to provide a selected input of thermal energy to vulcanize the green tire, the overall heat phase including a steam phase and a subsequent heat phase after the steam phase, wherein the overall heat phase comprises the steps:
        introducing steam into the heating bellows for a duration of time during the steam phase to heat the green tire;
        extending the duration of time of the steam phase based at least on the determined idle time and a defined idle time threshold;
        monitoring and measuring an actual temperature progression of the heating bellows over a duration of time during the subsequent heat phase;
        evaluating a difference between a target temperature progression and the measured actual temperature progression during the subsequent heat phase;
        extending the duration of time of the subsequent heat phase based at least on the difference between the target temperature progression and the measured actual temperature progression to achieve the selected input of thermal energy to vulcanize the green tire; and
        completing the tire vulcanization.

2. The method as claimed in claim 1, the defined idle time threshold is 30 minutes.

3. The method of claim 1, the steam phase is extended by 10% when the determined idle time is greater than 30 minutes and less than 60 minutes.

4. The method of claim 1, the steam phase is extended by 20% when the determined idle time is greater than 60 minutes and less than 90 minutes.

5. The method of claim 1, the steam phase is extended by 30% when the determined idle time is greater than greater than 90 minutes and less than 120 minutes.

6. The method of claim 1, the steam phase is extended by 40% when the determined idle time is greater than 120 minutes.

* * * * *